United States Patent [19]

Yoshida et al.

[11] Patent Number: 5,450,096
[45] Date of Patent: Sep. 12, 1995

[54] CHARACTER GENERATING METHOD AND APPARATUS

[75] Inventors: Toshikuni Yoshida, Kawasaki; Mutsumi Ohtomo, Sapporo, both of Japan

[73] Assignee: Fujitsu Limited, Kanagawa, Japan

[21] Appl. No.: 225,955

[22] Filed: Apr. 8, 1994

[30] Foreign Application Priority Data

Jul. 13, 1993 [JP] Japan ................. 5-195455

[51] Int. Cl.$^6$ ............................................. G09G 1/14
[52] U.S. Cl. ................... 345/141; 345/127; 345/129
[58] Field of Search .............. 382/47, 46, 22, 24; 345/126, 127, 129, 131, 141

[56] References Cited

U.S. PATENT DOCUMENTS

| | | | |
|---|---|---|---|
| 3,593,287 | 7/1971 | Kobayashi | 382/24 |
| 4,173,753 | 11/1979 | Chou | 382/24 |
| 4,845,768 | 7/1989 | Kochert | 382/46 |
| 4,905,166 | 2/1990 | Schuerman | . |
| 5,018,217 | 5/1991 | Yoshida | 345/127 |
| 5,050,225 | 9/1991 | Itoh | 345/126 |
| 5,325,447 | 6/1994 | Vogt | 382/47 |

FOREIGN PATENT DOCUMENTS 61-252583 11/1986 Japan .
3215893 9/1991 Japan .

OTHER PUBLICATIONS

Chen et al. "A New Approach For Recognition Multi-font Chinese Characters Used in a Special Application". Proc 11th IAPR Conference 11(B):479-482 1992.
Tandy, "Going Ahead with Extended Color Basic". Ft Worth. 1981 p. 9.
Casey et al. "Parallel Linear Transforms on Two Dimensional Binary Images". IBM Tech Disc Bull 13(11):3267-3268. 1971.
Gonzales et al. "Digital Image Processing". Addison-Wesley 2nd Ed. 1987. pp. 398-402.

*Primary Examiner*—Ulysses Weldon
*Assistant Examiner*—Matthew Luu

[57] ABSTRACT

In a character generating method and apparatus for producing a bit map image of a designated character size from outline data, a character developing circuit calculates a shearing factor of a target stroke when a conversion scaling factor is smaller than a predetermined scaling factor, performs shearing compensation on coordinates of individual points of the target stroke along a coordinate axis according to a type of the target stroke, based on the shearing factor, and converts outline coordinate data obtained through the shearing compensation, to physical coordinates, for the designated size based on the conversion scaling factor. A drawing circuit produces a bit map image of the designated character size from the converted physical coordinates. The character generating apparatus further has a font memory for storing the outline data. The character developing circuit calculates the shearing factor of the target stroke, read from the font memory from coordinates of two predetermined points of a stroke expressed by the outline data.

18 Claims, 14 Drawing Sheets

○ points constituted part
■ part original point on reference line

START PART

A1 ORIGINAL POINT OF PART (70, 544)

(0, 30)
(78, 39)
(78, 9)
(17, 2)

MIDDLE PART
A2  ORIGINAL POINT OF PART (125, 550)

(0, 30)
(712, 108)
(712, 80)
(0, 0)

END PART
A3 ORIGINAL POINT OF PART (947, 642)

(-110, 87)
(-197, -22)
(0, 0)
(-3, 26)

CHARACTER GENERATING METHOD AND APPARATUS

BACKGROUND OF THE INVENTION

1. Field of the Invention

The present invention relates to a character generating method and apparatus for developing an outline character, expressed by a logical coordinate system, on physical coordinates expressed by integer values.

2. Description of the Related Art

A printer, a display device or the like requires that character patterns be generated to print or display characters. In the generation of character patterns, recently, characters of various character sizes are demanded even for the same character. Therefore, the memory capacity increases if characters of various character sizes are given for the same character, particularly, for Kanji characters or the like which have many types of characters.

As a solution to this problem, an outline font system has been proposed. According to this system, data of character patterns whose contour lines are expressed in real numbers and also by a logical coordinate system, is provided, and this data is converted to a designated character size coordinate system to develop characters to a bit map image expressed by integer values.

It is demanded that characters should be restored to the original designs with high fidelity even after enlargement or reduction.

FIGS. 13A, 13B, 14A and 14B are explanatory diagrams of prior art.

Conventionally, in developing logical coordinate data expressed by real numbers, such as a figure or an outline font, to a bit map image expressed by integer values, a fractional portion of character data is rounded so that the data will be expressed in the units of pixels of a printer or a display. In order to express coordinate data by closest pixels, rounding is typically performed to count fractions of 5 and over as a whole number.

This will be explained with reference to Mincho Kanji characters "Mon" (meaning "gate") and "Nana" (meaning "seven") expressed in an outline form as shown in FIGS. 13A and 13B. The individual contour points which constitute the Mincho Kanji characters "Mon" and "Nana" are stored by integer logical coordinates like 1000×1000. Character outline data on the logical coordinates are converted to the necessary character size to have coordinate values including decimal points. If all the points are rounded to express the coordinate values by physical coordinates, all the points will be rounded to the nearest whole numbers.

When the outline data of those Kanji characters shown in FIGS. 13A and 13B are converted to the character size of, for example, 15×24 dots, the resultant Kanji characters becomes as shown in FIGS. 14A and 14B, respectively.

According to the prior art, the smaller the character point size becomes, the lower the character quality becomes so that any resultant character would have a poor appearance. This originates from a rounding error that occurs when the image of a character whose contour line is expressed by an equation is expressed by an integer coordinate system or physical coordinates. In particular, an oblique stroke or the like will have steps defined by vertical lines and horizontal lines, thus deteriorating the character quality. For instance, the Kanji character "Mon" in FIG. 14A has steps on vertical strokes on the right-hand and left-hand sides. Likewise, the Kanji character "Nana" in FIG. 14B has steps on top and bottom horizontal strokes.

SUMMARY OF THE INVENTION

It is therefore an object of the present invention to provide a character generating method and apparatus which prevent steps from being formed on strokes of a bit map image of a character even when this character is converted to a small point size.

To achieve this object, according to one aspect of this invention, there is provided a character generating method for producing a bit map image of a designated character size from outline data obtained by expressing a contour line of a character by logical coordinates, which method comprises the steps of:

calculating a shearing factor of a target stroke for shearing compensation among strokes constituting the character from coordinates of predetermined two points of when a conversion scaling factor to the designated character size is smaller than a predetermined scaling factor;

performing shearing compensation on coordinates of individual points of the target stroke along a coordinate axis according to a type of the target stroke, based on the shearing factor;

converting outline coordinate data obtained through the shearing compensation, to physical coordinates, expressed by integers, for the designated size based on the conversion scaling factor; and producing a bit map image of the designated character size from the converted physical coordinates.

According to another aspect of this invention, there is provided a character generating apparatus for producing a bit map image of a designated character size from outline data obtained by expressing a contour line of a character by logical coordinates, which apparatus comprises:

a font memory for storing the outline data;

a character developing circuit for, when a conversion scaling factor to the designated character size is smaller than a predetermined scaling factor, calculating a shearing factor of a target stroke for shearing compensation among strokes read from the font memory and constituting the character from coordinates of predetermined two points of the target stroke for shearing compensation, performing shearing compensation on coordinates of individual points of the target stroke along a coordinate axis according to a type of the target stroke, based on the shearing factor, and converting outline coordinate data obtained through the shearing compensation, to physical coordinates, expressed by integers, for the designated size based on the conversion scaling factor; and a drawing circuit for producing a bit map image of the designated character size from the converted physical coordinates.

There is a limit to the reproduction of an oblique stroke having a certain number of or fewer points. As an oblique stroke is normally subjected to an optical illusion compensation, the present invention aims at improving the readability by producing a bit map image of a small-size character, which will not undergo the optical illusion compensation. In generating a character having of a predetermined number of or fewer points, the vertical or horizontal thickness of an oblique stroke is not altered and the stroke is made vertical or horizontal using shearing deformation in the present invention. More specifically, a shearing factor is computed from the coordinates of predetermined two points of a stroke constituting a character, and the coordinates of each point on each stroke along the coordinate axis according to the type of the stroke are computed through shearing compensation based on the shearing factor, thereby providing a straight stroke without steps.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8A and 8B are explanatory diagrams of a character pattern after compensation according to this embodiment;

DETAILED DESCRIPTION OF THE PREFERRED EMBODIMENT

Figure 1:
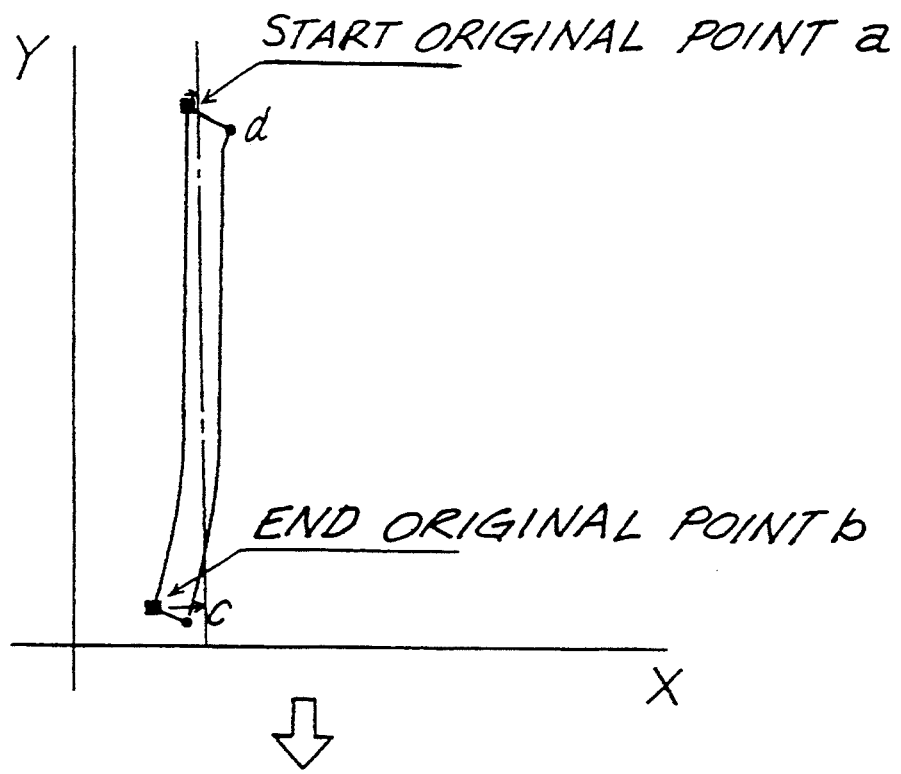
FIG. 1 is a diagram of the principle of the present invention.
Figure 1:
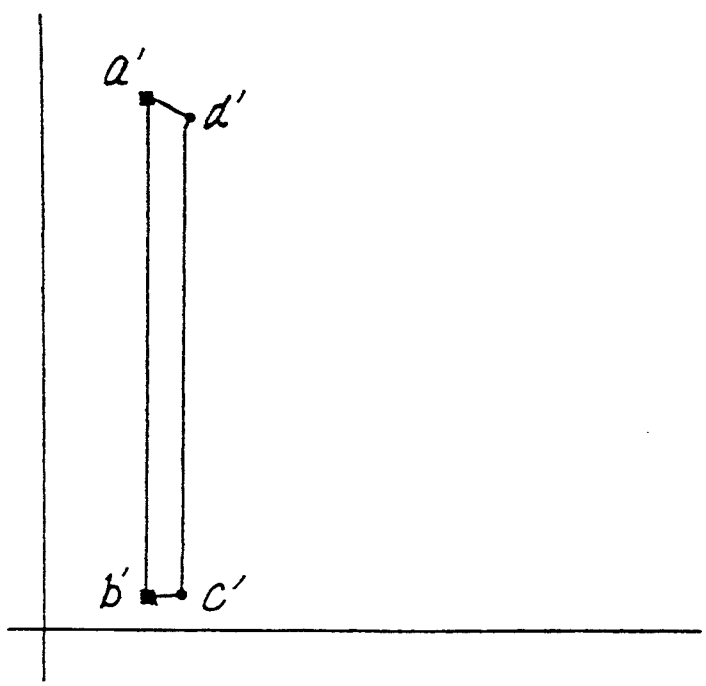

FIG. 1 illustrates the principle of the present invention.

The present invention deals with an oblique stroke as shown in FIG. 1. The shearing factor of the stroke is calculated from a start origin a and an end origin b of that stroke. Then, individual contour points a, b, c and d are subjected to shearing compensation according to the shearing factor, yielding compensated points a', b', c' and d'. It is apparent that an oblique stroke can be compensated to a straight stroke.

Figure 2:
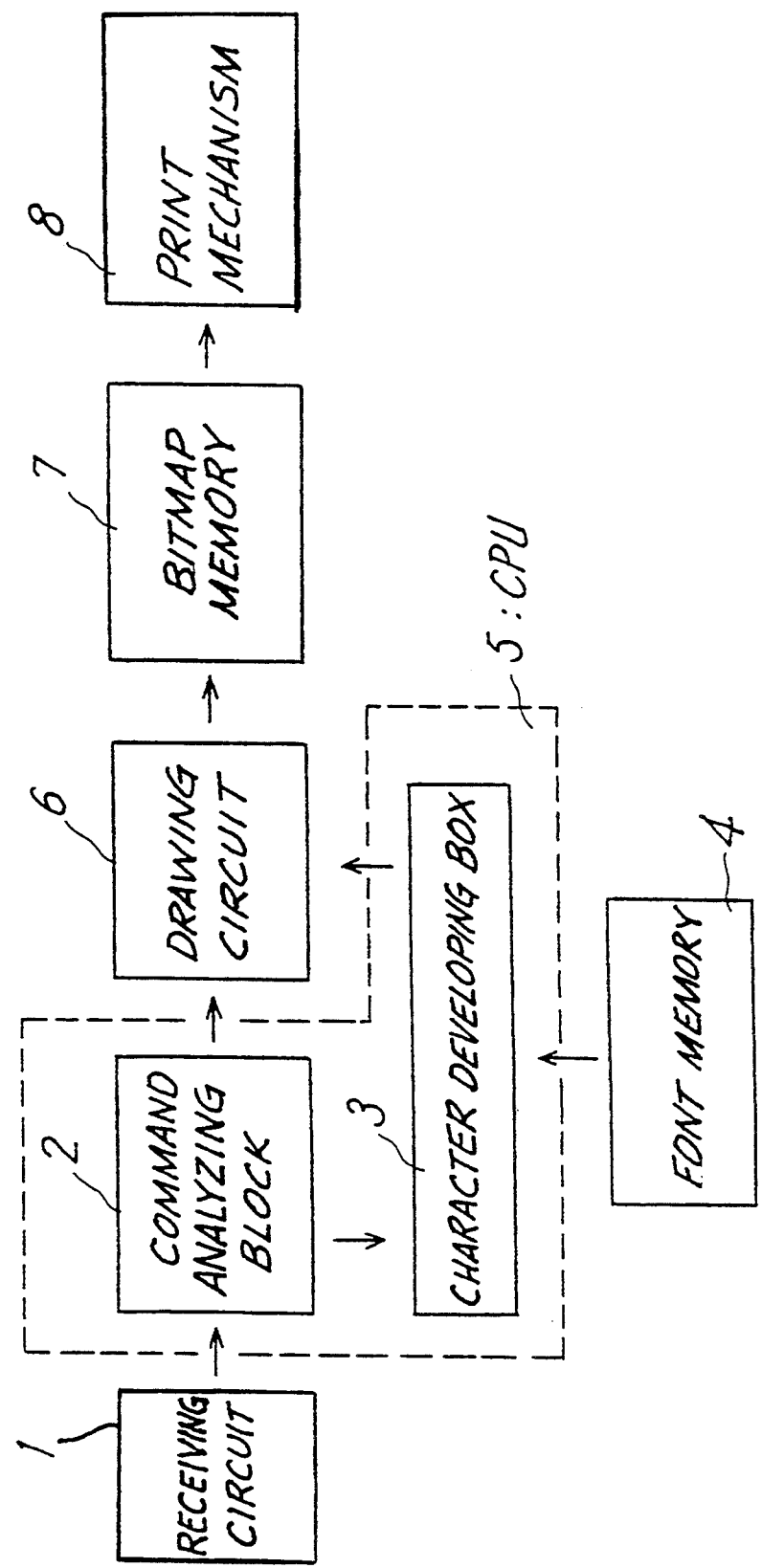
FIG. 2 is a block diagram showing one embodiment of the present invention.
Figure 3:
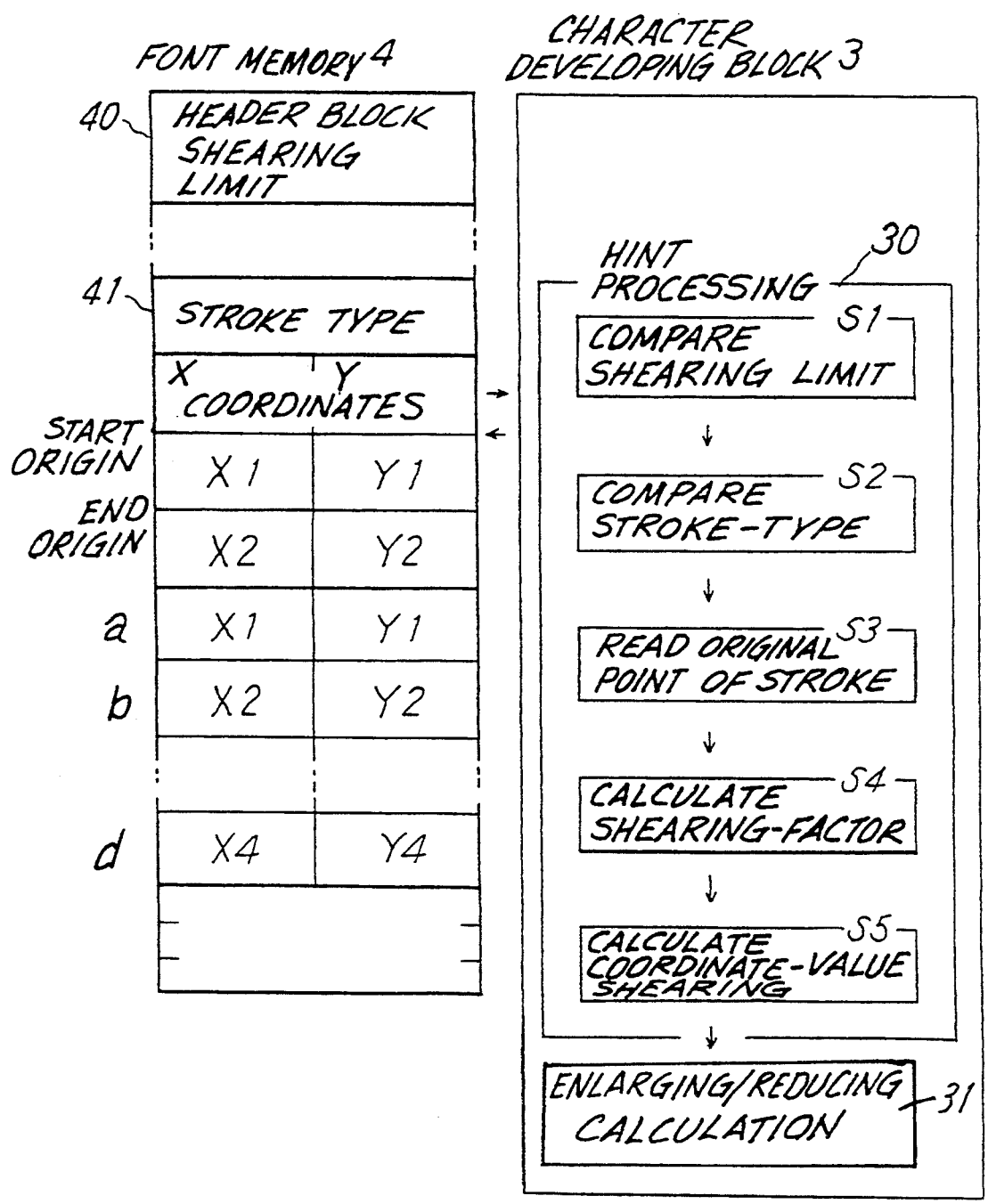
FIG. 3 is a block diagram showing the essential portions in FIG. 2.
Figure 4A:
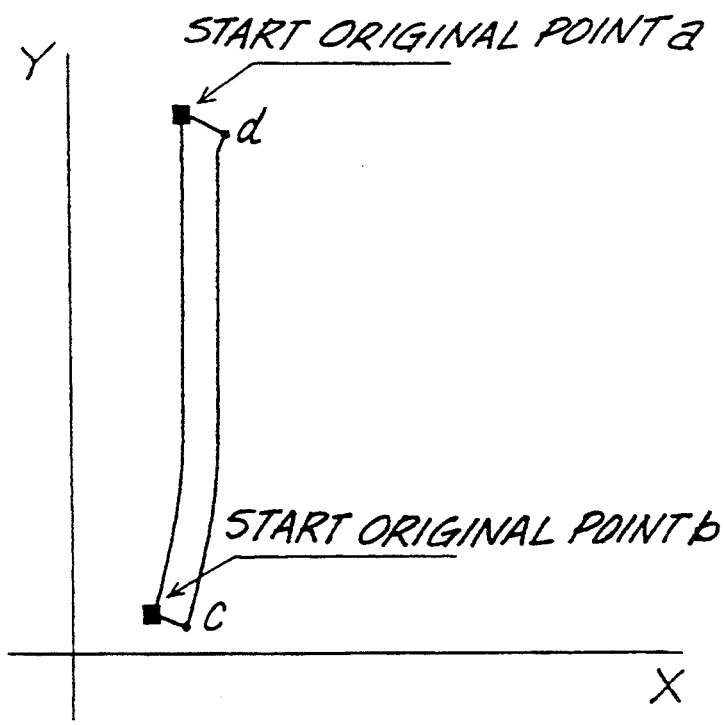
FIGS. 4A and 4B are diagrams showing the relation between a stroke and its origins according to this embodiment.
Figure 4B:
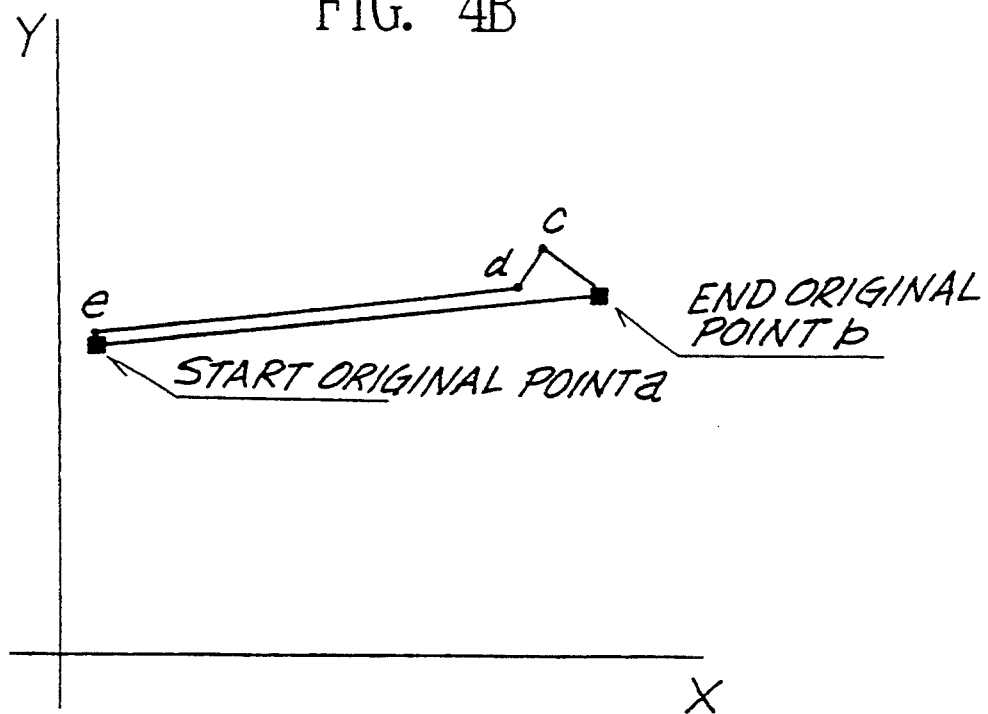
Figure 5A:
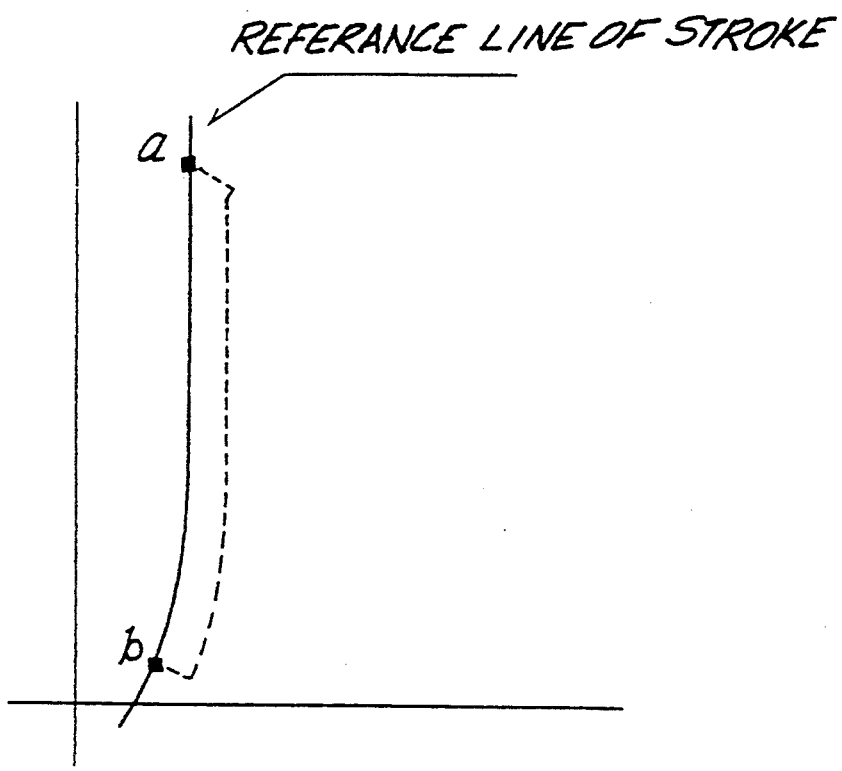
FIGS. 5A and 5B are diagrams showing the relation between a stroke and a reference line according to this embodiment.
Figure 5B:
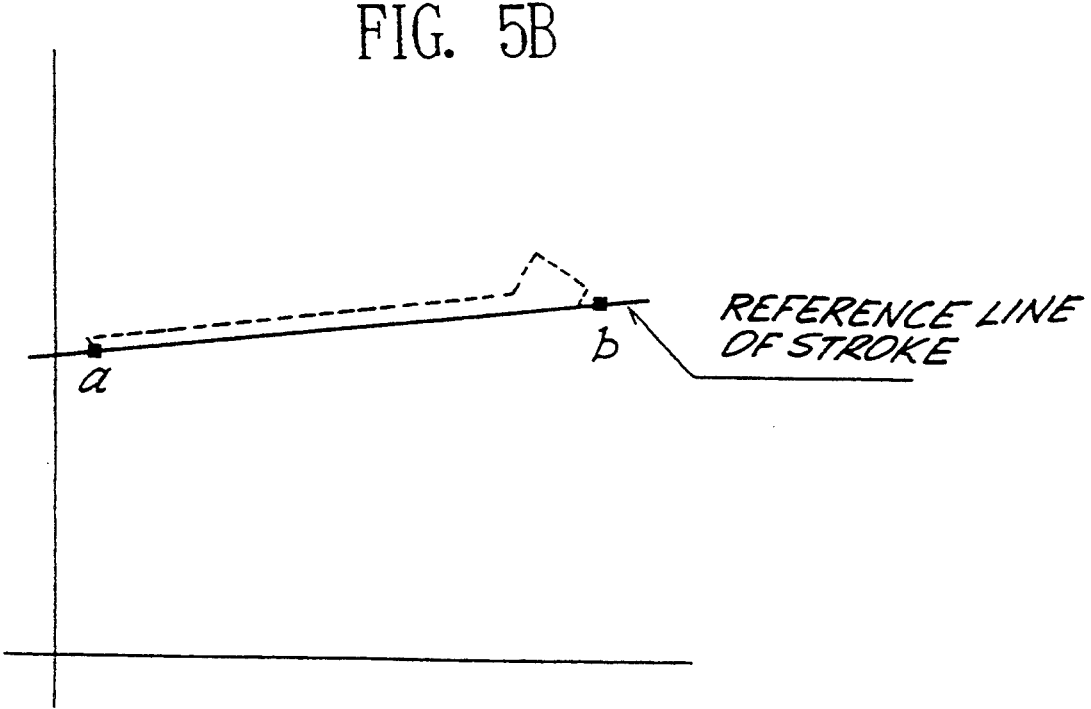
Figure 6A:
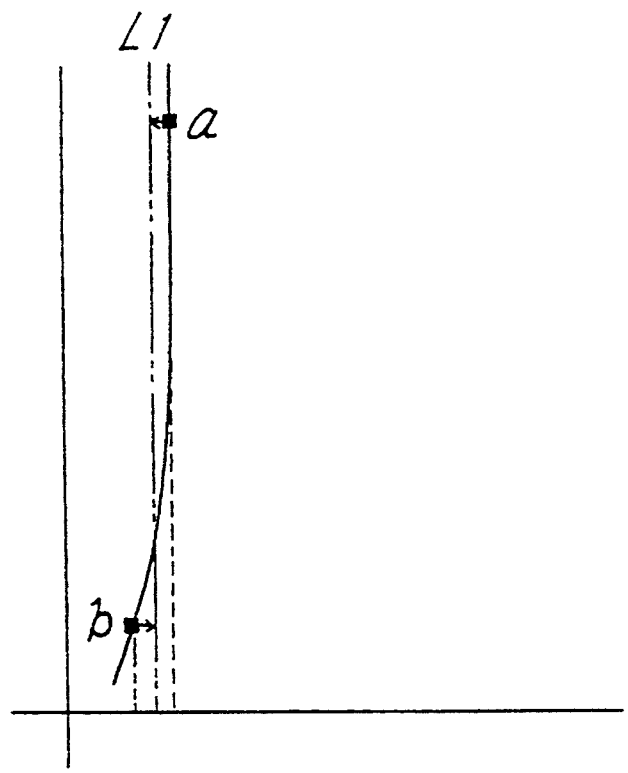
FIGS. 6A and 6B are diagrams for explaining a compensating operation according to this embodiment.
Figure 6B:
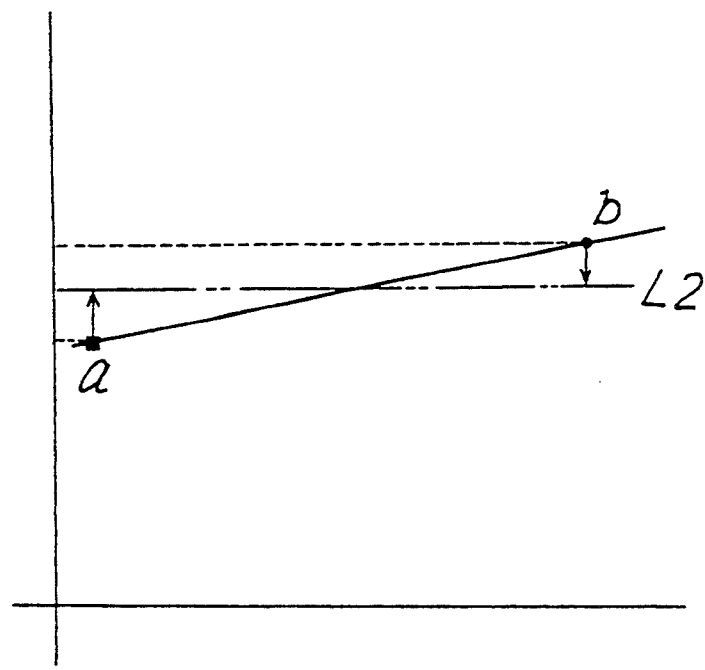
Figure 7A:
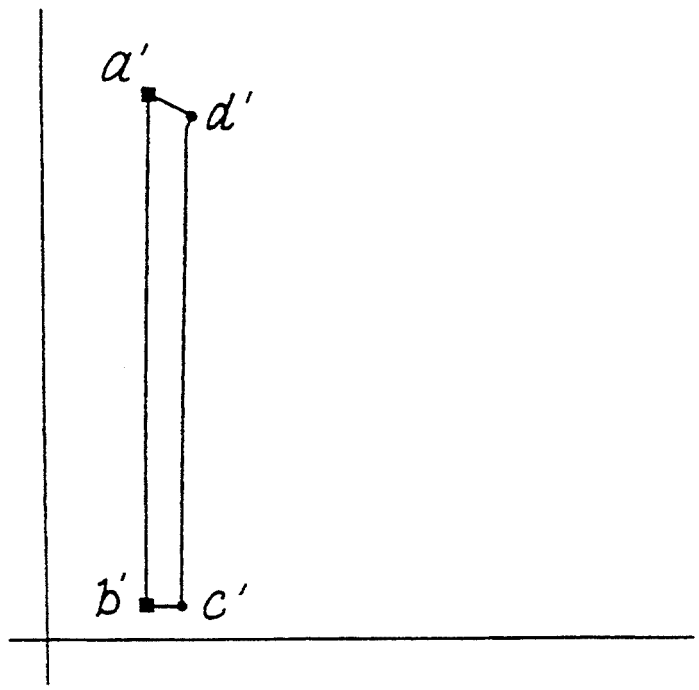
FIGS. 7A and 7B are explanatory diagrams of a stroke after compensation according to this embodiment.
Figure 7B:
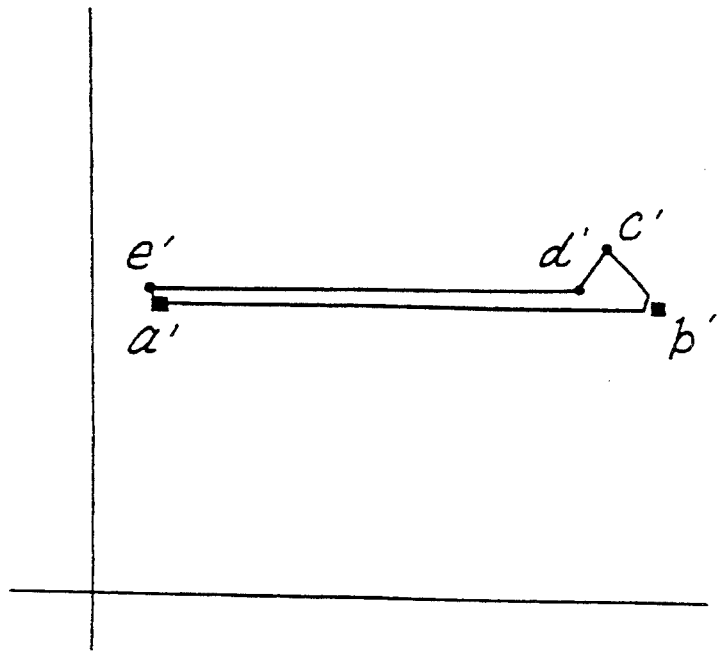
Figures 8A, 8B:
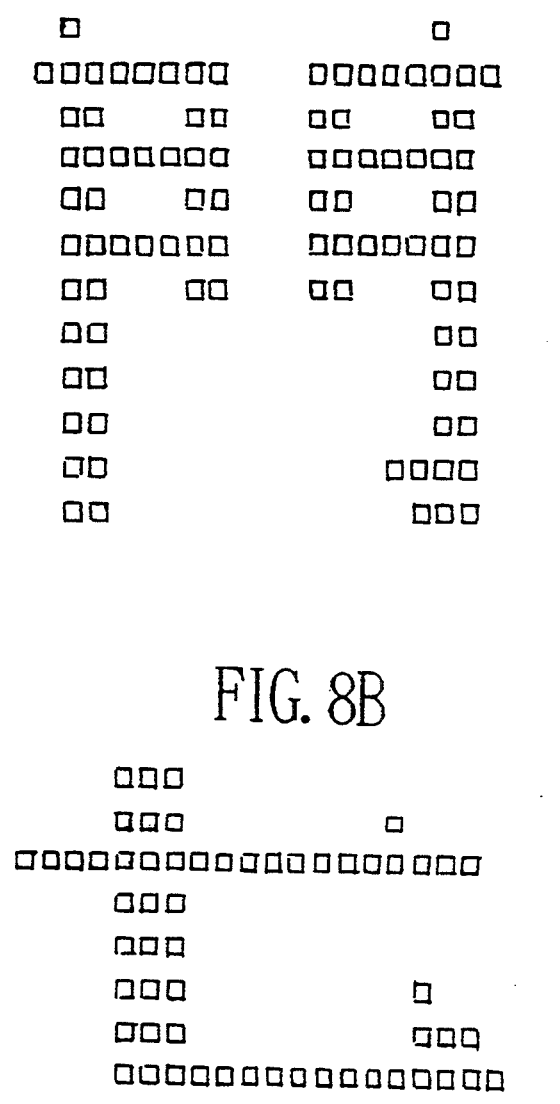

FIG. 2 is a block diagram showing one embodiment of the present invention, FIG. 3 is a block diagram showing the essential portions in FIG. 2, FIGS. 4A and 4B are diagrams showing the relation between a stroke and its origins according to this invention, FIGS. 5A and 5B are diagrams showing the relation between a stroke and a reference line according to this invention, FIGS. 6A and 6B are diagrams for explaining a compensating operation according to this invention, FIGS. 7A and 7B are explanatory diagrams of a stroke after compensation according to this invention, and FIGS. 8A and 8B are explanatory diagrams of a character pattern after compensation according to this invention.

Referring to FIG. 2, a receiving circuit 1 receives a print command and print data from a higher-level device (computer or the like). A command analyzing block 2 analyzes the meaning of the print command, etc. received at the receiving circuit 1, and separates the received data to a character and a figure.

A character developing block 3 receives a character code and character from the command analyzing block 2, reads character data from a font memory 4, and develops the associated character to a bit map image. This character developing block 3 will be described in detail later with reference to FIG. 3. The font memory 4 stores characters in an outline form, and will be described in detail later with reference to FIG. 3.

A CPU (character developing circuit) 5 executes the operations of the command analyzing block 2 and the character developing block 3. That is, the command analyzing block 2 and the character developing block 3 are the block expression of the program the CPU 5 runs.

A drawing circuit 6 developed character to a bit map image, overlaps the character and figure, which have been developed to bit map images, one on the other, and writes the resultant image in a bit map memory 7. The drawing circuit 6 is constituted of a known drawing LSI.

In the bit map memory 7, the bit map images of a character and a figure are written by the drawing circuit 6 as mentioned above. A printing mechanism 8, which is a page printer like an electrophotographing printer, prints data in the bit map memory 7 on a sheet of paper.

The operation of this embodiment will now be described. The meanings of the print command and print data received at the receiving circuit 1 are analyzed by the command analyzing block 2, and are separated into a character and a figure. A figure and an image are developed to bit map images by the drawing circuit 6. A character is developed to a bit map image with a designated conversion scaling factor by the character developing block 3, using outline font data stored in the font memory 4. The drawing circuit 6 overlaps the character and figure, which have been developed to bit map images, one on the other, and writes the resultant image in the bit map memory 7. The data in the bit map memory 7 will be printed on a sheet of paper by the printing mechanism 8.

The details of the character developing block 3 will be given block by block, referring to FIG. 3. A hinting block 30 performs a shearing operation on outline data (contour coordinate value) corresponding to a character code before a hinting process from the font memory 4. An enlarging/reducing circuit 31 performs an enlarging/reducing operation so that the sheared data will have the designated character size.

A shearing-limit comparing sub-block S1 in the hinting block 30 compares the shearing limit (conversion scaling factor) of a target typeface in the font memory 4 with the designated conversion scaling factor. When the conversion scaling factor for the development is equal to or smaller than the shearing limit, the sub-block S1 instructs a calculation for shearing compensation of the target character.

A stroke-type comparing sub-block S2 compares the type of each of the strokes of this character in the font memory 4 with the types of predetermined strokes that are to be subject to shearing compensation (vertical stroke and horizontal stroke in this example) to search for a target stroke.

A stroke-origin reading sub-block S3 reads predetermined origins (start origin and end origin) of the target stroke from the font memory 4.

A shearing-factor calculating sub-block S4 calculates a shearing factor from the read stroke origins. A coordinate-value shearing calculation sub-block S5 performs a shearing calculation on the coordinate values of each point on the stroke based on the shearing factor.

The font memory 4 includes a header block 40 where the type of a character set (Mincho, Gothic, etc.) and common data, such as the prepared date, are stored. A shearing limit (conversion scaling factor) is stored as control data of each character set in the header block 40. Provided at the positions corresponding to individual character codes in the font memory 4 are stroke data blocks 41 each of which stores the type of each of strokes constituting each character, the coordinates of the start origin of that stroke, the coordinates of the end origin of the stroke, and the coordinates of individual contour points of the stroke.

The character developing block 3 is constituted of a processor as mentioned above, and those blocks 30, 31 and S1 to S5 are software-based functional blocks.

The operation of this embodiment will now be described with reference to a vertical stroke shown in FIG. 4A and a horizontal stroke shown in FIG. 4B as examples. The vertical stroke is formed by contour points a, b, c and d. The logical coordinates (X, Y) of those individual contour points are stored in the associated stroke data block 41 in the font memory 4. The origins (start and end origins) of the stroke are stored in this stroke data block 41. As the stroke has the origins at the points a and b in the illustrated example, their coordinates (X1, Y1) and (X2, Y2) are stored in this block 41.

Likewise, the horizontal stroke is formed by contour points a, b, c, d and e. The logical coordinates (X, Y) of those individual contour points are stored in the associated stroke data block 41 in the font memory 4. The origins (start and end origins) of the stroke are stored in this stroke data block 41. As the stroke has the origins at the points a and b in the illustrated example, their coordinates (X1, Y1) and (X2, Y2) are stored in this block 41.

The operation of the above-described structure will now be discussed referring to FIGS. 4A through 7B. When a character code to be developed is given to the character developing block 3, this block 3 reads the shearing limit (conversion scaling factor) for the corresponding typeface from the header block 40 in the font memory 4. The shearing limit varies typeface by typeface, so that the shearing limit according to the designated typeface will be read out. Then, the character developing block 3 compares the read shearing limit with the conversion scaling factor for the development in the shearing-limit comparing process S1.

When determining that the conversion scaling factor for the development is smaller than the read shearing limit, the character developing block 3 executes a shearing operation. When determining that the conversion scaling factor for the development is not smaller than the read shearing limit, on the other hand, the character developing block 3 will execute no shearing operation on this character.

When determining that the shearing operation should be performed, the character developing block 3 searches the stroke data block 41 corresponding to the character code in the font memory 4 to read the type of each stroke constituting the target character in the stroke-type comparing process S2. The character developing block 3 then compares the read stroke type with the types of predetermined strokes (vertical stroke and horizontal stroke in this example) that are to be subject to shearing, to find a matched stroke. If there is no matched stroke, no shearing operation will be carried out.

When there is a matched stroke, the character developing block 3 reads the origin data of the matched stroke of the target character from the font memory 4 in the stroke-origin reading process S3. In this case, the coordinates (X1, Y1) of the stroke start origin a and the coordinates (X2, Y2) of the stroke end origin b are read.

Next, the character developing block 3 computes a shearing factor d1 in the direction of the X axis and a shearing factor d2 in the direction of the Y axis from the following equations in the shearing-factor calculating process S4.

$$d1 = -(X2 - X1)/(Y2 - Y1) \tag{1}$$

$$d2 = -(Y2 - Y1)/(X2 - X1) \tag{2}$$

After calculating the shearing factors d1 and d2, the character developing block 3 executes the coordinate-value shearing process S5 on the individual coordinate values. Each reference line for this shearing is a line connecting the origins as shown in FIGS. 5A and 5B. The shearing process corrects the shearing reference line to a straight line as shown in FIGS. 6A and 6B. Therefore, the shearing operation is performed only in the shearing direction determined by the stroke type.

With regard to the vertical stroke in FIGS. 4A, 5A and 6A, for example, shearing in the X direction will be performed to straighten the vertical stroke. With regard to the horizontal stroke in FIGS. 4B, 5B and 6B, for example, shearing in the Y direction will be performed to straighten the horizontal stroke. The following are equations for the shearing computation.

Shearing in the X direction $$X = X + d1 \cdot Y \tag{3}$$

$$Y = Y \tag{4}$$

Shearing in the Y direction $$X = X \tag{5}$$

$$Y = d2 \cdot X + Y \tag{6}$$

Accordingly, the character developing block 3 reads contour data of each matched stroke from the stroke data block 41 in the font memory 4, which corresponds to the character code, and then performs the shearing computation based on the above-given shearing equations.

For the vertical stroke in FIG. 4A, for example, the coordinates (X1 to X4, Y1 to Y4) of the individual points a', b', c' and d' after shearing compensation become as follows, as shown in FIG. 7A.

$$X1 = X1 + d1 \cdot Y1$$

$$Y1 = Y1$$

$$X2 = X2 + d1 \cdot Y2$$

$$Y2 = Y2$$

$$X3 = X3 + d1 \cdot Y3$$

$$Y3 = Y3$$

$$X4 = X4 + d1 \cdot Y4$$

$$Y4 = Y4$$

In other words, since shearing for a vertical stroke is carried out in the X direction, the shearing computation is performed only on the X coordinates and the Y coordinates are left intact.

Similarly, with regard to the horizontal stroke in FIG. 4B, the coordinates (X1 to X5, Y1 to Y5) of the individual points a', b', c', d' and e' after shearing compensation become as follows, as apparent from FIG. 7B.

$$X1 = X1$$

$$Y1 = X1 + d2 \cdot Y1$$

$$X2 = X2$$

$$Y2 = X2 + d2 \cdot Y2$$

$$X3 = X3$$

$$Y3 = X3 + d2 \cdot Y3$$

$$X4 = X4$$

$$Y4 = X4 + d2 \cdot Y4$$

$$X5 = X5$$

$$Y5 = X5 + d2 \cdot Y5$$

In other words, since shearing for a horizontal stroke is carried out in the Y direction, the shearing computation is performed only on the Y coordinates and the X coordinates are left intact. Through this computation, the outline data of the aforementioned strokes will become as shown in FIGS. 7A and 7B.

The character developing block 3 causes the enlarging/reducing circuit 31 to multiply the outline coordinate data of the compensated strokes of this character and uncompensated outline coordinate data by the designated conversion scaling factor to obtain the contour coordinates of the designated point size, and then performs rounding. The converted coordinate data are sent to the drawing circuit 6 to fill inside the contour line of the stroke. As a result, the contours as shown in FIGS. 4A and 4B are developed to the character patterns as shown in FIGS. 8A and 8B.

As an oblique stroke for a character of a small point size is subjected to shearing compensation to be a vertical or horizontal stroke in the above manner, the resultant developed character pattern will have no steps and will have a good appearance.

Figure 9:
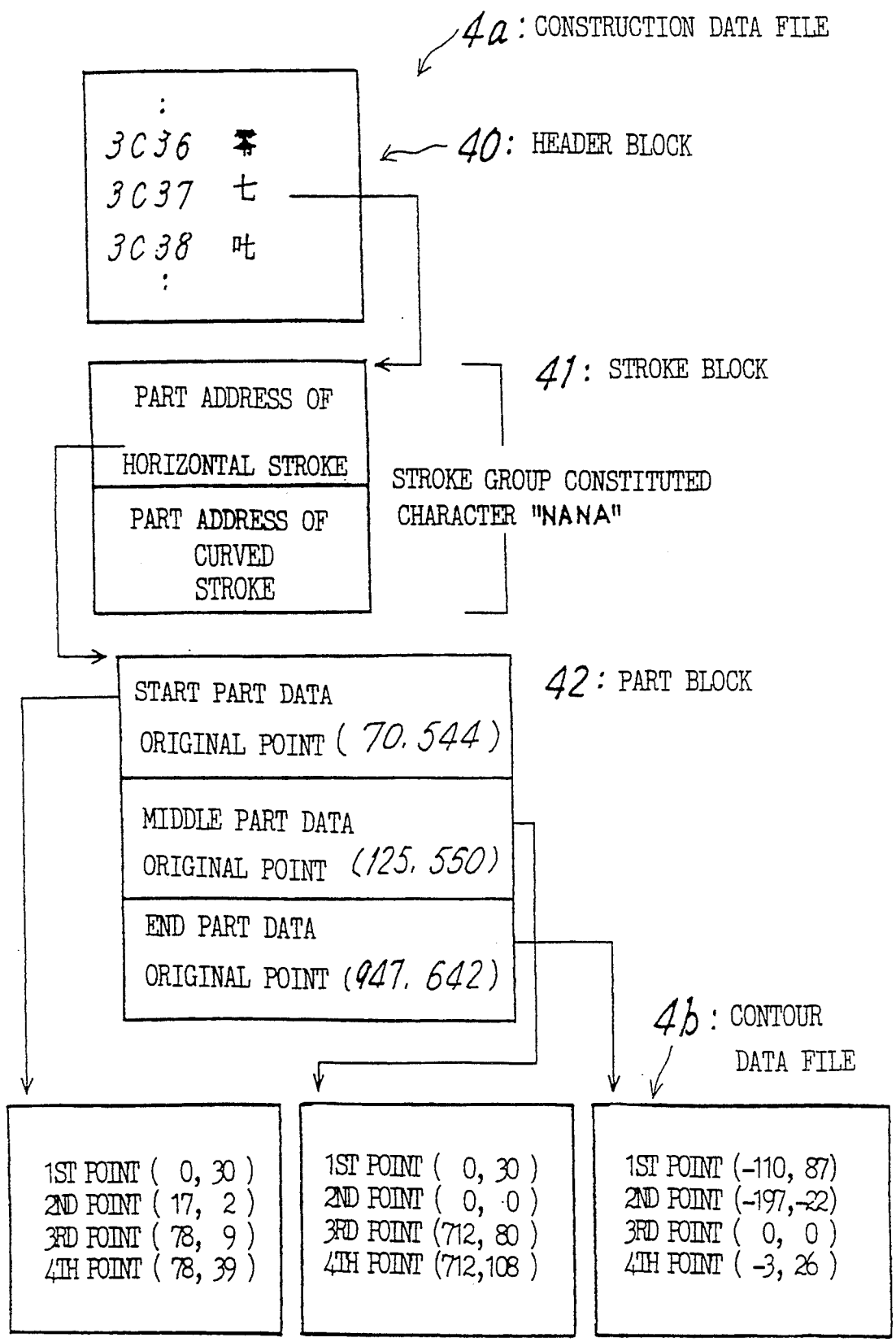
FIG. 9 is a structural diagram of a font memory according to a modification of the present invention.
Figure 10A:
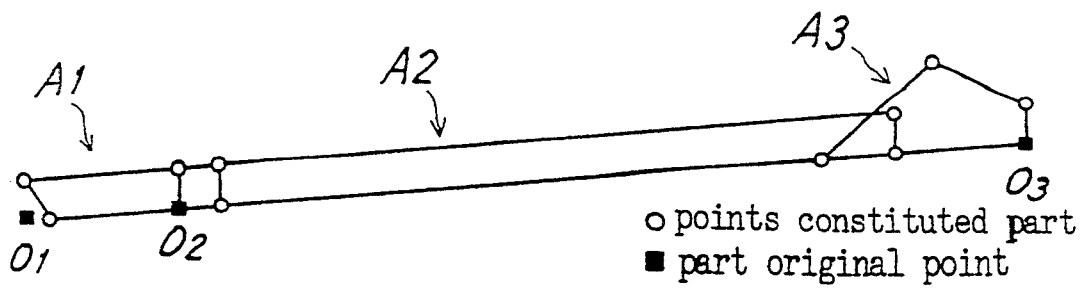
FIGS. 10A and 10B are diagrams showing the relation between a stroke and its parts according to this modification.
Figure 10B:
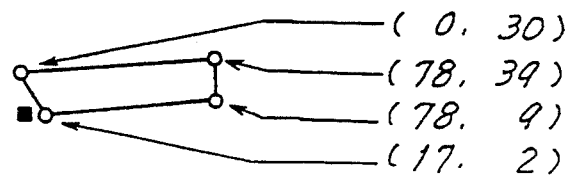
Figure 10B:
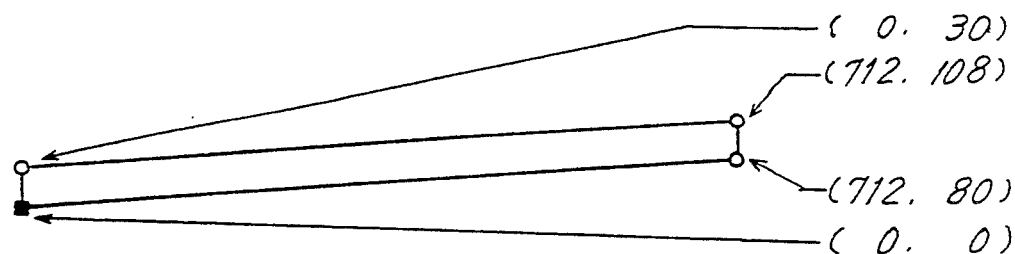
Figure 10B:
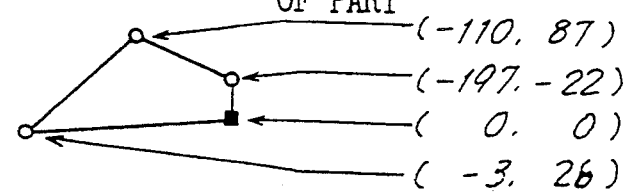
Figure 11:
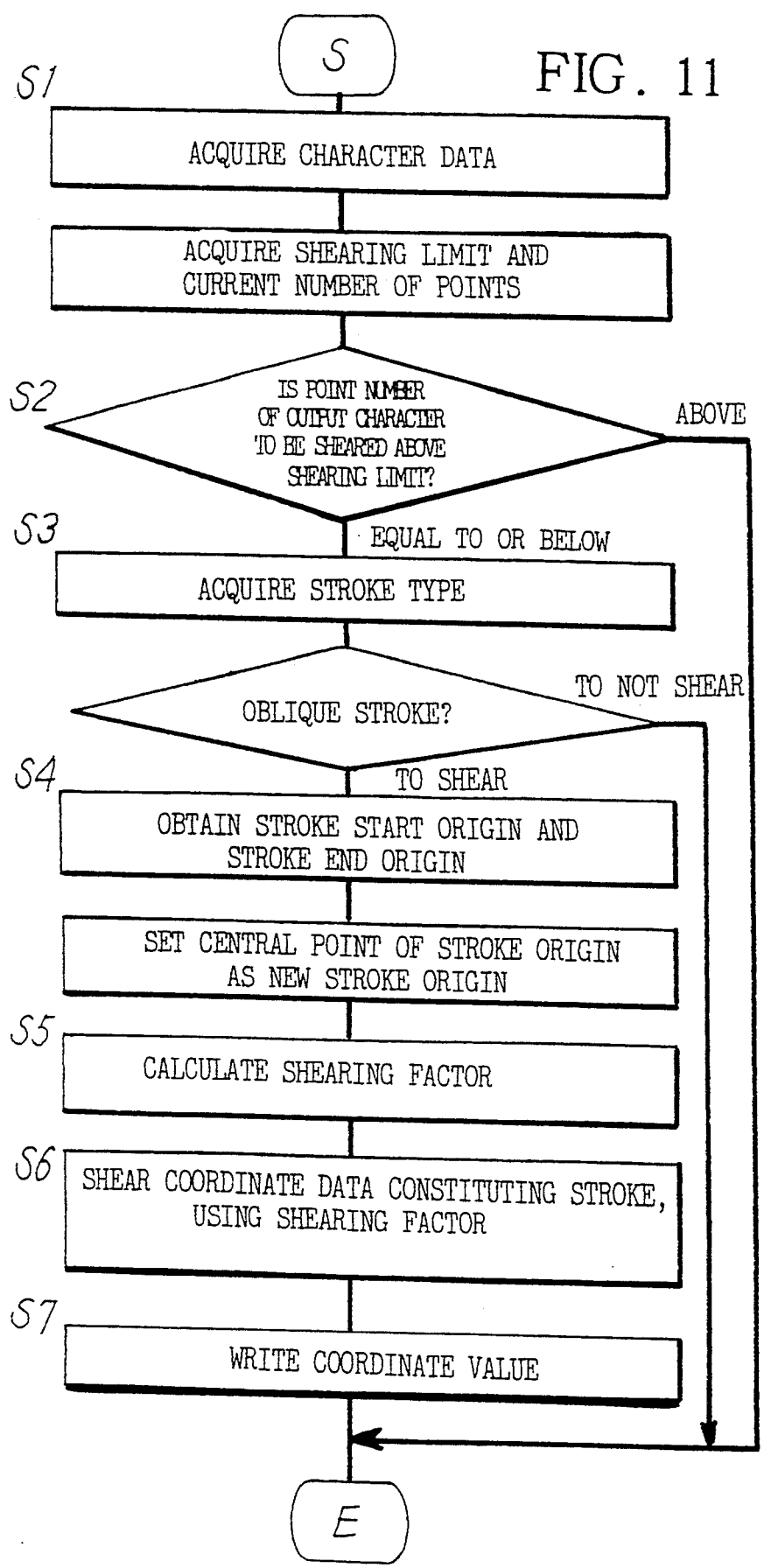
FIG. 11 is a flowchart for this modification.
Figure 12A:
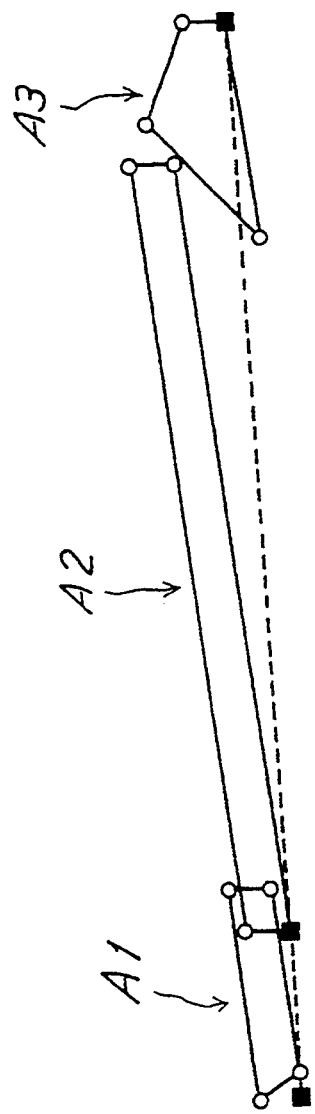
FIGS. 12A and 12B are diagrams for explaining a compensating operation according to this modification.
Figure 12B:
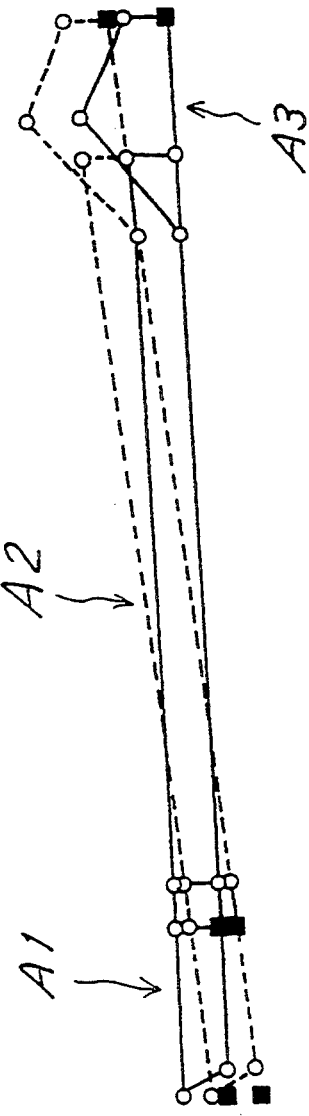
Figure 13A:
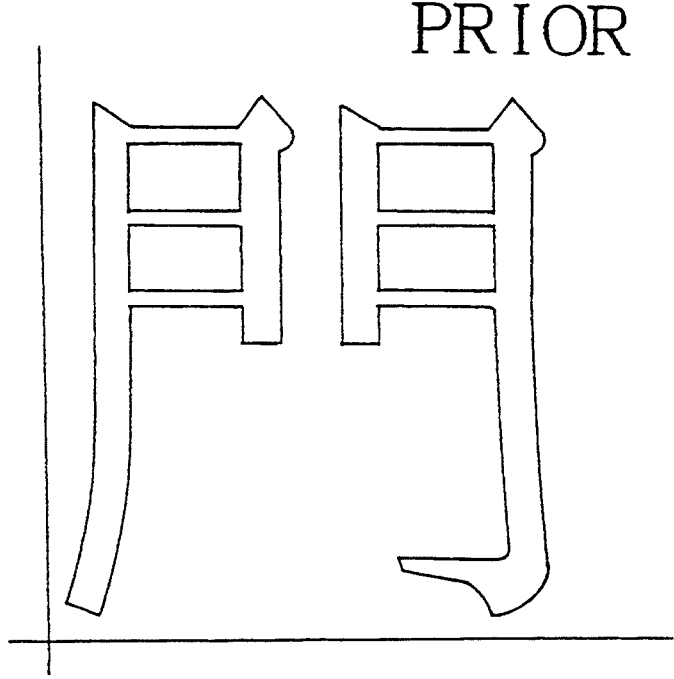
FIGS. 13A and 13B are explanatory diagrams of conventional outline fonts.
Figure 13B:
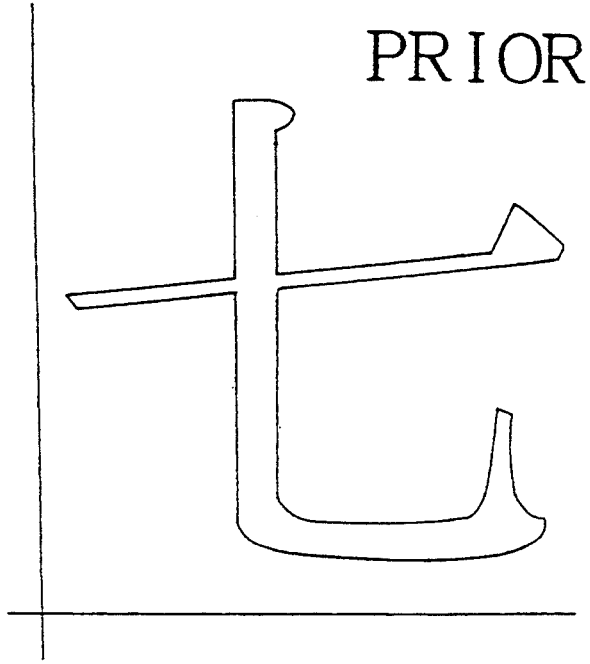
Figure 14A:
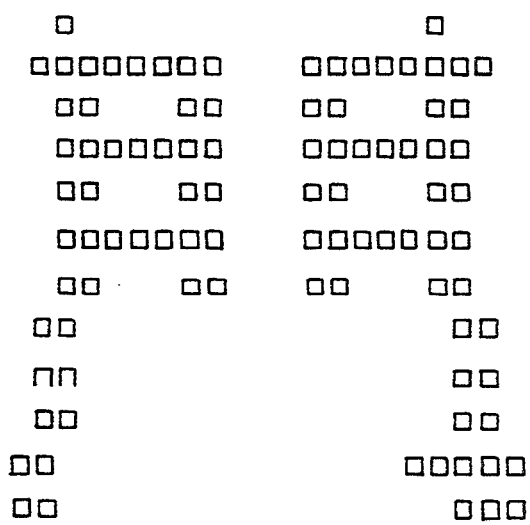
FIGS. 14A and 14B are explanatory diagrams of prior art.
Figure 14B:
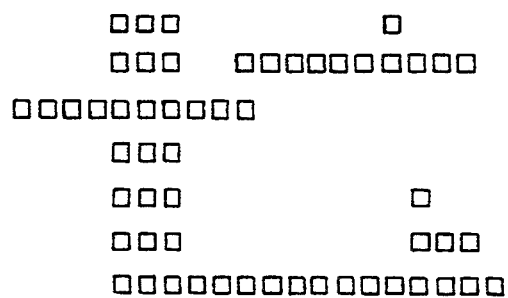

FIG. 9 is a structural diagram of a font memory according to a modification of the present invention, FIGS. 10A and 10B are diagrams showing the relation between a stroke and its parts according to this modification, FIG. 11 is a flowchart for this modification, and FIGS. 12A and 12B are diagrams for explaining a compensating operation according to this modification.

The description will now be given with reference to the case where a character is broken down in a hierarchical structure to elements constituting that character, each element to strokes constituting that element, and each stroke to parts corresponding to the stroking start portion, stroking end portion, etc.

Further, in this description it will be explained that in order to reduce the amount of data, the font memory 4 comprises a structure data file 4a in FIG. 9 for storing the hierarchical structures and characteristic data of characters, and a contour data file 4b for storing contour data of each character broken down to strokes or parts.

As shown in FIG. 9, the structure data file 4a includes a header block 40 which has the type of a character set (Mincho, Gothic, etc.), common data, such as the prepared date, and a character point for searching for target data from the character code, a stroke block 41 having the addresses of part blocks 42 and those part blocks 42 where the origins of the individual parts or the like are stored. The contour data file 4b stores coordinated data of the individual parts.

The aforementioned shearing limit is stored in this header block 40. The coordinate data of the parts are stored as relative coordinates from the origins (absolute coordinates) of the parts.

Such a memory structure allows the structure data file 4a to have original coordinates of the individual parts as common typeface data, not typeface by typeface. Therefore, the contour data block of the contour data file 4b has only to store coordinates of relative positions from the origins of each part which varies from one typeface to another, thus eliminating the need for the absolute coordinates of the logical coordinate system. Therefore, the origins of each part can be shared by a plurality of typefaces, thus reducing the memory capacity accordingly. What is more, the individual parts in the contour data block 43 can be shared by a plurality of typefaces and a plurality of characters, thus ensuring further reduction of the memory capacity.

A description will now be given with reference to the horizontal stroke "Ichi" in the Mincho Kanji character " Nana" shown in FIG. 10A. As shown in FIG. 10A, the horizontal stroke has a stroking start portion A1, a straight line portion A2 and a stroking end portion A3 laid out in the stroking order of the character. Accordingly, the common absolute coordinates (origins) of those three parts of the horizontal stroke "Ichi" are stored in the part blocks in the structure data file 4a. The coordinates of the contour points of each part are stored in the contour data file 4b in the form of the coordinates of the relative positions from the origins, as shown in FIG. 10B.

The operation will now be described with reference to FIGS. 12A and 12B according to the flowchart in FIG. 11.

(S1) The CPU (hereinafter referred to as "processor") 5 obtains character data to be developed. The character data includes a character code and a shearing factor. The processor 5 refers to the header block 40 of the structure data file 4a to acquire the shearing limit for the typeface of the character code in question.

(S2) Then, the processor 5 compares the read shearing limit with the conversion scaling factor for the development. When determining that the conversion scaling factor for the development is smaller than the read shearing limit, the processor 5 executes a shearing operation. When determining that the conversion scaling factor for the development is not smaller than the read shearing limit, on the other hand, the processor 5 will execute no shearing operation on this character and will terminate this process.

(S3) When determining that the shearing operation should be performed, the processor 5 searches the stroke data block 41 corresponding to the character code in the font memory 4 to read the type of each stroke constituting the target character. The processor 5 then compares the read stroke type with the types of predetermined strokes (vertical stroke and horizontal stroke in this example) that are to be subject to shearing, to find a matched stroke. If there is no matched stroke, no shearing operation will be carried out and this process will be terminated accordingly.

(S4) When there is a matched stroke, the processor 5 reads the origin data of each part of the matched stroke of the target character from the associated part block 42 of the structure data file 4a in the font memory 4. Then, the processor 5 acquires the central points of the stroke origins from those parts, as new stroke origins.

(S5) The processor 5 computes a shearing factor d1 in the X direction and a shearing factor d2 in the Y direction from the above-given equations (1) and (2).

(S6) Next, the processor 5 reads out contour data of the parts of each stroke, which are to be sheared, from the contour data file 4b in the font memory 4. Then, the processor 5 performs a shearing computation using the above-given equations (3) to (6).

(S7) The coordinates of the contour points will then be written.

Thereafter, the absolute origin coordinates of each part are added to the relative coordinates of that part to acquire the absolute position of each part in the enlarging/reducing computation which has been described with reference to FIG. 3. The processor 5 multiplies those coordinate data by the designated conversion scaling factor to obtain the contour coordinates of the designated point size, and then performs rounding. The processor 5 then sends the converted coordinate data to the drawing circuit 6 to fill inside the contour line of the stroke, thus completing the bit map image of the character in question.

The above operation will be specifically discussed with reference to the horizontal stroke "Ichi" as shown in FIGS. 10A and 10B. First, the origins O1 (70, 544), O2 (125, 550), and O3 (947, 642) of the individual parts on the reference line of this stroke are shifted to be on the same horizontal line. Because the stroke in question is a horizontal stroke, the center point Ym of the Y coordinate of the origin of each part is obtained from the part origin O1 and the part origin O3 as follows.

$$Ym = (642 - 544)/2 + 544 = 593$$

Shifting the individual part origins O1, O2 and O3 to this center point yields:

| | |
|---|---|
| O1 | (70, 544) - (70, 593) |
| O2 | (125, 544) - (125, 593) |
| O3 | (947, 642) - (947, 593) |

In this state, the individual parts A1, A2 and A3 have the same Y coordinate of their origins but are not linked to one another yet, as shown in FIG. 12A.

Next, the shearing factors d1 and d2 are computed from the equations (1) and (2). In this example, as the head part is a start part and the last part is an end part, no end discrimination data is needed.

$$d1 = -(947-70)/(642-544) = -8.94898$$

$$d2 = -(642-544)/(947-70) = -0.11174$$

With the individual part origins taken as the shearing reference points, the constituting points of each part are sheared. Because the stroke in question is a horizontal stroke, this shearing is carried out based on the equations (5) and (6).

$$X = X$$

$$Y = d2 \cdot X + Y$$

Consequently, the absolute coordinates of the individual points of the start part A1 become as follows.

The Y coordinate of the first point is $-0.11174 \times 0 + 30 = 30$, so that the relative coordinates after shearing become (0, 30). Thus, adding the relative coordinates to the coordinates of the part origin yields the absolute coordinates of (70, 623).

The Y coordinate of the second point is $-0.11174 \times 17 + 2 = 0$, so that the relative coordinates after shearing become (17, 0). Likewise, the absolute coordinates become (87, 593).

The Y coordinate of the third point is $-0.11174 \times 78 + 9 = 0$, so that the relative coordinates after shearing become (78, 0). Likewise, the absolute coordinates become (148,593).

The Y coordinate of the fourth point is $-0.11174 \times 78 + 39 = 30$, so that the relative coordinates after shearing become (78, 30). Likewise, the absolute coordinates become (148,623).

The absolute coordinates of the individual points of the middle part A2 become as follows.

As the Y coordinate of the first point is $-0.11174 \times 0 + 30 = 30$, the relative coordinates after shearing become (0, 30), and the absolute coordinates become (125, 623).

As the Y coordinate of the second point is $-0.11174 \times 0 + 0 = 0$, the relative coordinates after shearing become (0, 0), and the absolute coordinates become (125, 593).

As the Y coordinate of the third point is $-0.11174 \times 712 + 80 = 0$, the relative coordinates after shearing become (712, 0), and the absolute coordinates become (837, 593).

As the Y coordinate of the fourth point is $-0.11174 \times 712 + 108 = 28$, the relative coordinates after shearing become (712, 28), and the absolute coordinates become (837, 621).

The absolute coordinates of the individual points of the end part A3 become as follows.

As the Y coordinate of the first point is $-0.11174 \times -110 + 87 = 99$, the relative coordinates after shearing become (−110, 99), and the absolute coordinates become (837, 622).

As the Y coordinate of the second point is −0.11174×−197−22=0, the relative coordinates after shearing become (−197, 0) and the absolute coordinates become (750,593).

As the Y coordinate of the third point is −0.11174×0+0=0, the relative coordinates after shearing become (0, 0), and the absolute coordinates become (947, 593).

As the Y coordinate of the fourth point is −0.11174×3+26=26, the relative coordinates after shearing become (−3, 26), and the absolute coordinates become (944, 619).

Through the above processing, the sheared stroke as indicated by the solid line in FIG. 12B will be obtained.

It is apparent that this modification has the same advantages as the above-described embodiment. Further, even if a stroke is broken down to parts, the stroke can be compensated to a straight line after shearing compensation. Furthermore, the font memory is separated into a structure data file and a contour data file, thus contributing to the reduction of the memory capacity.

Besides the above embodiment and one modification, the present invention may be modified as follows. First, although the foregoing description has been given with reference to the Mincho Kanji characters "Mon" and "Nana," this invention can be adapted to cope with characters having other horizontal strokes and those having other vertical strokes. Secondly, this invention can be adapted to cope with oblique strokes as well as the above-discussed horizontal strokes and vertical strokes. In this case, a reference line is an oblique line connecting two contour points. Thirdly, although the font memory has been explained as a part-segmenting type, it may be a stroke-segmenting type. Fourthly, while the original outline data is compensated, coordinate data after multiplication by the shearing factor may be subjected to shearing compensation.

Although only one embodiment and one modification of the present invention have been described herein, it should be apparent to those skilled in the art that the present invention may be embodied in many other specific forms without departing from the spirit or scope of the invention.

In short, according to the present invention, a shearing factor is calculated from the coordinates of predetermined two points on each of the strokes which constitute a character, and the coordinates of the individual points of each stroke along the coordinate axis according to the type of that stroke are subjected to shearing compensation based on the shearing factor, thereby providing a straight stroke having no steps. Even for a small-size character, therefore, a bit map image with a good appearance can be produced. Even if outline data is used, it is possible to prevent the generation of a character pattern which appears different from the image of the original character, thus improving the character quality.

What is claimed is:

1. A character generating method for producing a bit map image of a designated character size from outline data obtained by expressing a contour line of a character by logical coordinates, wherein each character is divided into a plurality of strokes, said method comprising the steps of:

reading out outline data of a stroke from a memory;

calculating a shearing factor of a target stroke for shearing compensation from coordinates of predetermined two points of the stroke expressed by the outline data when a conversion scaling factor to said designated character size is smaller than a predetermined scaling factor;

performing shearing compensation on coordinates of individual points of said target stroke along a coordinate axis according to a type of said target stroke, based on said shearing factor;

converting outline coordinate data obtained through said shearing compensation, to physical coordinates, expressed by integers, for said designated size based on said conversion scaling factor; and producing a bit map image of said designated character size from said converted physical coordinates, wherein said shearing factor calculating step includes the steps of:

comparing said conversion scaling factor with said predetermined scaling factor;

obtaining the target stroke for shearing compensation from strokes constituting said when said conversion scaling factor is smaller than said predetermined scaling factor; and calculating said shearing factor of said target stroke for shearing compensation from start and end origin coordinates of said target stroke, read from the memory.

2. The character generating method for producing a bit map image of a designated character size from outline data obtained by expressing a contour line of a character by logical coordinates, wherein each character is divided into a plurality of strokes, said method comprising the steps of:

reading out outline data of a stroke from a memory;

calculating a shearing factor of a target stroke for shearing compensation from coordinates of predetermined two points of the stroke expressed by the outline data when a conversion scaling factor to said designated character size is smaller than a predetermined scaling factor;

performing shearing compensation on coordinates of individual points of said target stroke along a coordinate axis according to a type of said target stroke, based on said shearing factor;

converting outline coordinate data obtained through said shearing compensation, to physical coordinates, expressed by integers, for said designated size based on said conversion scaling factor; and producing a bit map image of said designated character size from said converted physical coordinates, wherein said step of performing shearing compensation includes adding results of multiplication of coordinates on a coordinate axis perpendicular to a specific coordinate axis determined by said type of said stroke by said shearing factor, to coordinates on said specific coordinate axis.

3. The character generating method for producing a bit map image of a designated character size from outline data obtained by expressing a contour line of a character by logical coordinates, wherein each character is divided into a plurality of strokes, said method comprising the steps of:

reading out outline data of a stroke from a memory;

calculating a shearing factor of a target stroke for shearing compensation from coordinates of predetermined two points of the stroke expressed by the outline data when a conversion scaling factor to said designated character size is smaller than a predetermined scaling factor;

performing shearing compensation on coordinates of individual points of said target stroke along a coordinate axis according to a type of said target stroke, based on said shearing factor;

converting outline coordinate data obtained through said shearing compensation, to physical coordinates, expressed by integers, for said designated size based on said conversion scaling factor; and producing a bit map image of said designated character size from said converged physical coordinates, wherein said shearing factor calculating step includes the steps of:

comparing said conversion scaling factor with said predetermined scaling factor, obtaining the target stroke for shearing compensation from strokes constituting said character when said conversion scaling factor is smaller than said predetermined scaling factor, and calculating said shearing factor of said target stroke for shearing compensation from start and end origin coordinates of said target stroke, read from the memory; and wherein said step of performing shearing compensation includes calculating coordinates of individual points of individual parts, constituting said stroke, on a coordinate axis according to said type of said stroke through shearing compensation based on said shearing factor.

4. The character generating method according to claim 1, wherein said step of performing shearing compensation includes calculating coordinates of individual points of individual parts, constituting said stroke, on a coordinate axis according to said type of said stroke through shearing compensation based on said shearing factor.

5. The character generating method according to claim 4, wherein said step of performing shearing compensation includes the steps of:

obtaining a reference line from coordinates of origins of said individual parts and shifting said coordinates of said origins of said individual parts onto said reference line;

compensating coordinates of said individual points of said individual parts on said coordinate axis according to said type of said stroke and indicated by relative coordinates from said origins of said parts, based on said shearing factor; and calculating absolute coordinates of said individual parts by adding said coordinates of said origins of said parts after shifting to said relative coordinates of said individual points of said individual parts after compensation.

6. The character generating method according to claim 4, wherein said shearing factor calculating step includes the steps of:

comparing said conversion scaling factor with said predetermined scaling factor;

obtaining the target stroke for shearing compensation from strokes constituting said character when said conversion scaling factor is smaller than said predetermined scaling factor; and calculating said shearing factor of said target stroke for shearing compensation from start and end origin coordinates of said target stroke, read from the memory.

7. The character generating method according to claim 4, wherein said step of performing shearing compensation includes adding results of multiplication of coordinates on a coordinate axis perpendicular to a specific coordinate axis determined by said type of stroke by said shearing factor, to coordinates on said specific coordinate axis.

8. The character generating method according to claim 6, wherein said step of performing shearing compensation includes adding results of multiplication of coordinates on a coordinate axis perpendicular to a specific coordinate axis determined by said type of said stroke by said shearing factor, to coordinates on said specific coordinate axis.

9. The character generating method according to claim 1, wherein said comparing step compares said conversion scaling factor with a predetermined scaling factor set for each typeface.

10. A character generating apparatus for producing a bit map image of a designated character size from outline data obtained by expressing a contour line of a character by logical coordinates wherein each character is divided into a plurality of strokes, said apparatus comprising:

a font memory for storing said outline data;

a character developing circuit for reading said outline data and calculating, when a conversion scaling factor to said designated character size is smaller than a predetermined scaling factor, a shearing factor of a target stroke for shearing compensation from coordinates of predetermined two points of a stroke expressed by the outline data, performing shearing compensation on coordinates of individual points of said target stroke along a coordinate axis according to a type of said target stroke, based on said shearing factor, and converting outline coordinate data obtained through said shearing compensation, to physical coordinates, expressed by integers, for said designated size based on said conversion scaling factor; and a drawing circuit for producing a bit map image of said designated character size from said converted physical coordinates, wherein said font memory stores said predetermined scaling factor and types of strokes constituting said character; and wherein when said conversion scaling factor is smaller than said predetermined scaling factor, said character developing circuit obtains said target stroke for shearing compensation from said type of said stroke and calculates said shearing factor for said target stroke from coordinates of start and end origins of said target stroke.

11. The character generating apparatus for producing a bit map image of a designated character size from outline data obtained by expressing a contour line of a character by logical coordinates wherein each character divided into a plurality of strokes, said apparatus comprising:

a font memory for storing said outline data;

a character developing circuit for reading said outline data and calculating, when a conversion scaling factor to said designated character size is smaller than a predetermined scaling factor, a shearing factor of a target stroke for shearing compensation from coordinates of predetermined two points of a stroke expressed by the outline data, performing shearing compensating on coordinates of individual points of said target stroke along a coordinate axis according to a type of said target stroke, based on said shearing factor, and converting outline coordinate data obtained through said shearing compensation, to physical coordinates, expressed by integers, for said designated size based on said conversion scaling factor; and a drawing circuit for producing a bit map image of said designated character size from said converted physical coordinates, wherein to execute shearing compensation, said character developing circuit adds results of multiplication of coordinates on a coordinate axis perpendicular to a specific coordinate axis determined by said type of said stroke by said shearing factor, to coordinates on said specific coordinate axis.

12. The character generating apparatus for producing a bit map image of a designated character size from outline data obtained by pressing a contour line of a character by logical coordinates, wherein each character is divided into a plurality of strokes, said apparatus comprising:

a font memory for storing said outline data;

a character developing circuit for reading said outline data and calculating, when a conversion scaling factor to said designated character size is smaller than a predetermined scaling factor, a shearing factor of a target stroke for shearing compensation from coordinates of predetermined two points of a stroke expressed by the outline data, performing shearing compensation on coordinates of individual points of said target stroke along a coordinate axis according to a type of said target stroke, based on said shearing factor, and converting outline coordinate data obtained through said shearing compensation, to physical coordinates, expressed by integers, for said designated size based on said conversion scaling factor; and a drawing circuit for producing a bit map image of said designated character size from said converted physical coordinates, wherein said font memory stores said predetermined scaling factor and types of strokes constituting said character, and when said conversion scaling factor is smaller than said predetermined scaling factor, said character developing circuit obtains said target stroke and calculates said shearing factor for said target stroke from start and end origin coordinates of said target stroke; and wherein to execute shearing compensation, said character developing circuit adds results of multiplication of coordinates on a coordinate axis perpendicular to a specific coordinate axis determined by said type of said stroke by said shearing factor, to coordinates on said specific coordinate axis.

13. The character generating apparatus according to claim 10, wherein said font memory stores outline data having said stroke broken down to constituting parts; and to wherein execute said shearing compensation, said character developing circuit calculates coordinates of individual points of individual parts, constituting said stroke, on a coordinate axis according to said type of said stroke through shearing compensation based on said shearing factor.

14. The character generating apparatus according to claim 13, wherein said font memory stores origin coordinates of said parts and coordinates of individual points of said parts, expressed by relative coordinates from said origin coordinates of said parts; and to wherein execute said shearing compensation, said character developing circuit obtains a reference line from coordinates of origins of said individual parts, shifts said coordinates of said origins of said individual parts onto said reference line, compensates coordinates of said individual points of said individual parts on said coordinate axis according to said type of said stroke, based on said shearing factor, and calculates absolute coordinates of said individual parts by adding said coordinates of said origins of said parts after shifting to said relative coordinates of said individual points of said individual parts after compensation.

15. The character generating apparatus according to claim 13, wherein said font memory stores said predetermined scaling factor and types of strokes constituting said character; and wherein when said conversion scaling factor is smaller than said predetermined scaling factor, said character developing circuit obtains said target stroke for shearing compensation from said type of said stroke and calculates said shearing factor for said target stroke from coordinates of origins of said target stroke.

16. The character generating apparatus according to claim 13, wherein to execute shearing compensation, said character developing circuit adds results of multiplication of coordinates on a coordinate axis perpendicular to a specific coordinate axis determined by said type of said stroke by said shearing factor, to coordinates on said specific coordinate axis.

17. The character generating apparatus according to claim 15, wherein to execute shearing compensation, said character developing circuit adds results of multiplication of coordinates on a coordinate axis perpendicular to a specific coordinate axis determined by said type of said stroke by said shearing factor, to coordinates on said specific coordinate axis.

18. The character generating apparatus according to claim 10, wherein said font memory stores a predetermined scaling factor set for each typeface; and said character developing circuit compares said conversion scaling factor with said predetermined scaling factor for each typeface to calculate said shearing factor.

* * * * *